(12) United States Patent
Sanchez (10) Patent No.: US 12,373,849 B2
(45) Date of Patent: Jul. 29, 2025

(54) SYSTEMS AND METHODS FOR VALIDATING PLANTING OF TREES

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 310 days.

(21) Appl. No.: 17/935,399

(22) Filed: Sep. 26, 2022

(65) Prior Publication Data

US 2023/0017596 A1    Jan. 19, 2023

Related U.S. Application Data

(63) Continuation of application No. PCT/US2021/023639, filed on Mar. 23, 2021.

(Continued)

(51) Int. Cl.
*G06Q 30/018* (2023.01)
*B60W 40/09* (2012.01)
(Continued)

(52) U.S. Cl.
CPC .......... *G06Q 30/018* (2013.01); *B60W 40/09* (2013.01); *G01C 21/3469* (2013.01);
(Continued)

(58) Field of Classification Search
CPC ............. G06Q 30/018; G06Q 30/0201; G06Q 30/0208; G06Q 30/0284; G06Q 30/0641;
(Continued)

(56) References Cited

U.S. PATENT DOCUMENTS

| | | |
|---|---|---|
| 7,103,460 B1 | 9/2006 | Breed |
| 10,127,597 B2 | 11/2018 | Gebhardt et al. |

(Continued)

FOREIGN PATENT DOCUMENTS

| | | |
|---|---|---|
| AU | 2020100151 | 2/2020 |
| WO | 2017/219121 A2 | 12/2017 |

OTHER PUBLICATIONS

International Search Report and Written Opinion received for PCT Patent Application No. PCT/US21/23555, mailed on Jun. 8, 2021, 15 pages.

(Continued)

*Primary Examiner* — Neil R McLean
(74) *Attorney, Agent, or Firm* — BRYAN CAVE LEIGHTON PAISNER LLP (57) ABSTRACT

Method and system for validating planting of trees. For example, the method includes receiving a first image depicting a tree, receiving a second image depicting an environment where the tree is to be planted, receiving a third image depicting the tree having been planted in the environment, selecting and encoding a first patch of the first image that depicts the tree, selecting and encoding a second patch of the second image that depicts the environment, selecting and encoding a third patch of the third image that depicts both the tree and the environment, and comparing the encoded patches to determine whether the tree has been planted in the environment.

20 Claims, 6 Drawing Sheets

Related U.S. Application Data (60) Provisional application No. 63/000,874, filed on Mar. 27, 2020.

(51) Int. Cl.

| | | |
|---|---|---|
| *G01C 21/34* | (2006.01) | |
| *G01C 21/36* | (2006.01) | |
| *G05D 21/00* | (2006.01) | |
| *G06E 3/00* | (2006.01) | |
| *G06F 3/0482* | (2013.01) | |
| *G06F 3/0484* | (2022.01) | |
| *G06G 7/70* | (2006.01) | |
| *G06Q 30/0201* | (2023.01) | |
| *G06Q 30/0208* | (2023.01) | |
| *G06Q 30/0283* | (2023.01) | |
| *G06Q 30/0601* | (2023.01) | |
| *G06Q 40/08* | (2012.01) | |
| *G06Q 50/40* | (2024.01) | |
| *G06T 7/00* | (2017.01) | |
| *G06T 11/00* | (2006.01) | |
| *G06V 20/10* | (2022.01) | |
| *G07C 5/08* | (2006.01) | |
| *G16Z 99/00* | (2019.01) | |

(52) U.S. Cl.
CPC ......... *G01C 21/3617* (2013.01); *G05D 21/00* (2013.01); *G06E 3/001* (2013.01); *G06F 3/0482* (2013.01); *G06F 3/0484* (2013.01); *G06G 7/70* (2013.01); *G06Q 30/0201* (2013.01); *G06Q 30/0208* (2013.01); *G06Q 30/0284* (2013.01); *G06Q 30/0641* (2013.01); *G06Q 40/08* (2013.01); *G06Q 50/40* (2024.01); *G06T 7/0002* (2013.01); *G06T 11/00* (2013.01); *G06V 20/188* (2022.01); *G07C 5/0841* (2013.01); *G16Z 99/00* (2019.02); *B60W 2540/30* (2013.01)

(58) Field of Classification Search
CPC .... G06Q 40/08; G06Q 50/40; G06Q 30/0241; G06Q 30/0255; G06Q 30/0277; G06Q 10/00; B60W 40/09; B60W 2540/30; G01C 21/3469; G01C 21/3617; G05D 21/00; G06E 3/001; G06F 3/0482; G06F 3/0484; G06F 3/147; G06F 16/958; G06G 7/70; G06T 7/0002; G06T 11/00; G06V 20/188; G07C 5/0841; G16Z 99/00; G06N 3/08
USPC ....................................................... 382/110
See application file for complete search history.

(56) References Cited

U.S. PATENT DOCUMENTS

| | | |
|---|---|---|
| 10,445,758 B1 | 10/2019 | Bryer et al. |
| 10,830,605 B1 | 11/2020 | Chintakindi et al. |
| 10,915,964 B1 | 2/2021 | Purgatorio et al. |
| 11,341,525 B1 | 5/2022 | Sanchez |
| 2002/0081997 A1 | 6/2002 | Morishima |
| 2003/0195694 A1 | 10/2003 | Kozak et al. |
| 2004/0039503 A1 | 2/2004 | Doyle |
| 2004/0049424 A1 | 3/2004 | Murray et al. |
| 2005/0154669 A1 | 7/2005 | Streetman |
| 2008/0046277 A1 | 2/2008 | Stamets |
| 2009/0043687 A1 | 2/2009 | Van Soestbergen et al. |
| 2009/0174703 A1 | 7/2009 | Hermanson et al. |
| 2009/0210295 A1 | 8/2009 | Edholm et al. |
| 2009/0292617 A1 | 11/2009 | Sperling et al. |
| 2010/0211260 A1 | 8/2010 | De Sanctis |
| 2011/0093321 A1 | 4/2011 | Streetman |
| 2011/0099489 A1 | 4/2011 | Glenn et al. |
| 2011/0106370 A1 | 5/2011 | Duddle et al. |
| 2011/0137763 A1 | 6/2011 | Aguilar |
| 2011/0184784 A1 | 7/2011 | Rudow |
| 2012/0150754 A1 | 6/2012 | Belady |
| 2013/0080053 A1 | 3/2013 | Rakshit |
| 2013/0218427 A1 | 8/2013 | Mukhopadhyay et al. |
| 2013/0218446 A1 | 8/2013 | Bradley |
| 2013/0282454 A1 | 10/2013 | Alpert et al. |
| 2014/0019179 A1 | 1/2014 | Gosalvez et al. |
| 2014/0040029 A1 | 2/2014 | Vhora |
| 2014/0081579 A1 | 3/2014 | Tyburski |
| 2014/0099000 A1 | 4/2014 | Shamir et al. |
| 2014/0107927 A1 | 4/2014 | Rojas |
| 2014/0129080 A1 | 5/2014 | Leibowitz |
| 2014/0180726 A1 | 6/2014 | Lavie et al. |
| 2014/0354630 A1 | 12/2014 | Kim et al. |
| 2014/0365096 A1 | 12/2014 | Cooper et al. |
| 2015/0148005 A1 | 5/2015 | Chau et al. |
| 2015/0206248 A1 | 7/2015 | Kornweibel et al. |
| 2015/0276419 A1 | 10/2015 | Hashem et al. |
| 2015/0371251 A1 | 12/2015 | Limbasia et al. |
| 2016/0034910 A1 | 2/2016 | Davis |
| 2016/0232550 A1 | 8/2016 | Fletcher et al. |
| 2016/0292768 A1 | 10/2016 | Needham |
| 2016/0343037 A1 | 11/2016 | Nicholas et al. |
| 2017/0069016 A1 | 3/2017 | Rackley et al. |
| 2017/0151917 A1 | 6/2017 | Bradley et al. |
| 2017/0214760 A1 | 7/2017 | Lee et al. |
| 2017/0351978 A1 | 12/2017 | Bellowe |
| 2018/0033352 A1 | 2/2018 | Kufus |
| 2018/0285885 A1 | 10/2018 | Laberteaux et al. |
| 2019/0026364 A1 | 1/2019 | Sankovsky |
| 2019/0026788 A1 | 1/2019 | Garrity et al. |
| 2019/0162154 A1 | 5/2019 | Pompea et al. |
| 2019/0213097 A1 | 7/2019 | Jin et al. |
| 2019/0303668 A1* | 10/2019 | King ..................... H04W 4/80 |
| 2020/0027102 A1 | 1/2020 | Xu et al. |
| 2020/0029490 A1 | 1/2020 | Bertucci et al. |
| 2020/0041290 A1 | 2/2020 | Schmelzer et al. |
| 2020/0074266 A1 | 3/2020 | Peake et al. |
| 2020/0074492 A1 | 3/2020 | Scholl et al. |
| 2020/0103892 A1 | 4/2020 | Cella et al. |
| 2020/0159377 A1* | 5/2020 | Joyce .................. G06F 3/04845 |
| 2020/0193739 A1 | 6/2020 | Gintz et al. |
| 2020/0200649 A1 | 6/2020 | Ammoura et al. |
| 2020/0211122 A1 | 7/2020 | Chen et al. |
| 2020/0242513 A1 | 7/2020 | Blayvas et al. |
| 2021/0010816 A1 | 1/2021 | Schmelzer et al. |
| 2021/0256781 A1 | 8/2021 | Jörn |
| 2021/0349475 A1 | 11/2021 | O'Regan et al. |
| 2022/0189482 A1 | 6/2022 | Penilla et al. |
| 2023/0016696 A1 | 1/2023 | Sanchez |
| 2023/0186878 A1 | 6/2023 | Wipperfürth |
| 2023/0245009 A1 | 8/2023 | Roy |

OTHER PUBLICATIONS

International Search Report and Written Opinion received for PCT Patent Application No. PCT/US21/23556, mailed on Jun. 8, 2021, 11 pages.

International Search Report and Written Opinion received for PCT Patent Application No. PCT/US21/23579, mailed on Jun. 8, 2021, 9 pages.

International Search Report and Written Opinion received for PCT Patent Application No. PCT/US21/23621, mailed on Jun. 10, 2021, 8 pages.

International Search Report and Written Opinion received for PCT Patent Application No. PCT/US21/23626, mailed on Jun. 9, 2021, 8 pages.

International Search Report and Written Opinion received for PCT Patent Application No. PCT/US21/23628, mailed on Jun. 9, 2021, 8 pages.

International Search Report and Written Opinion received for PCT Patent Application No. PCT/US21/23634, mailed on Jun. 4, 2021, 12 pages.

(56) References Cited

OTHER PUBLICATIONS

International Search Report and Written Opinion received for PCT Patent Application No. PCT/US21/23639, mailed on Jun. 7, 2021, 8 pages.
International Search Report and Written Opinion received for PCT Patent Application No. PCT/US21/23645, mailed on Jun. 9, 2021, 8 pages.
International Search Report and Written Opinion received for PCT Patent Application No. PCT/US21/23668, mailed on Jun. 9, 2021, 11 pages.
B Libai et al. Setting Referral Fees in Affiliate Marketing. Journal of Service Research. 2003. [retrieved from internet on Apr. 8, 2023] <URL: https ://www.runi.ac. il/yedion/facultypublications/getfile.ashx?username=ebialogorsky&fileType=3&publicationId=628> (Year: 2003).
Committee on Trade and Investment. Life Cycle Assessment Best Practices of ISO 14040 Series. Retrieved from https://www.apec.org.docs/default-source/Publications/2004/2/Life-Cycle-Assessment-Best-Practices-of-International-Organization-for-Standardization-ISO-14040-Ser/04_cti_scsc_lca_rev.pdf Feb. 2004.
American Heritage Dictionary, Driving, Print date Oct. 7, 2023, https://www.ahdictionary.com/word/search.html?q=driving 2023.
American Heritage Dictionary, Telematics, Print date Oct. 7, 2023 https://www.ahdictionary.com/word/search.html?q=telematics 2023.
Dunkle Werner, K., Drive Behavior and Fuel Efficiency. University of Michigan. Retrieved from https://deepblue-lib-umich.edu/bitstream/handle/2027.42.798892/karldw.pdf Apr. 5, 2013.
Energy Information Administration. Methodologies for Estimating Fuel Consumption Using the 2009 National Household Travel Survey, retrieved from https://nhts.ornl.gov/2009/pub/EIA.pdf Mar. 2011.

\* cited by examiner

SYSTEMS AND METHODS FOR VALIDATING PLANTING OF TREES

CROSS-REFERENCE TO RELATED APPLICATIONS

This application is a continuation of International Application No. PCT/US2021/023639, filed Mar. 23, 2021, which claims priority to U.S. Provisional Patent Application No. 63/000,874, filed Mar. 27, 2020, the entire disclosures of which are incorporated by reference herein for all purposes.

International PCT Application No. PCT/US21/18233, titled "System and Methods for Providing Renewing Carbon Offsets" is incorporated by reference herein for all purposes.

The following five applications, including this one, are being filed concurrently and the other four are hereby incorporated by reference in their entirety for all purposes:

1. International PCT Application No. PCT/US21/23555, titled "Systems and Methods for Offering Carbon Offset Rewards that Correspond to Users";
2. International PCT Application No. PCT/US21/23556, titled "Systems and Methods for Providing Multiple Carbon Offset Sources";
3. International PCT Application No. PCT/US21/23579, titled "Systems and Methods for Generating Tree Imagery";
4. International PCT Application No. PCT/US21/23639, titled "Systems and Methods for Validating Planting of Trees"; and
5. International PCT Application No. PCT/US21/23645, titled "Systems and Methods for Providing Renewing Carbon Offsets for a User Driving Period".

FIELD OF THE DISCLOSURE

Some embodiments of the present disclosure are directed to validating the planting of trees. More particularly, certain embodiments of the present disclosure provide methods and systems for validating that a tree has been planted based upon images associated with the tree. Merely by way of example, the present disclosure has been applied to comparing different encoded patches of the images associated with the tree to verify that the tree has been planted. But it would be recognized that the present disclosure has much broader range of applicability.

BACKGROUND OF THE DISCLOSURE

Carbon emissions from vehicles represent a major contributor to climate change. Trees play an important role in mitigating climate change and have been used extensively to offset these carbon emissions. Hence it is highly desirable to develop techniques that can properly validate the planting of trees.

BRIEF SUMMARY OF THE DISCLOSURE

Some embodiments of the present disclosure are directed to validating the planting of trees. More particularly, certain embodiments of the present disclosure provide methods and systems for validating that a tree has been planted based upon images associated with the tree. Merely by way of example, the present disclosure has been applied to comparing different encoded patches of the images associated with the tree to verify that the tree has been planted. But it would be recognized that the present disclosure has much broader range of applicability.

According to certain embodiments, a method for validating planting of trees includes receiving a first image depicting a tree or a second image depicting an environment with a ground where the tree is to be planted, and receiving a third image depicting the tree having been planted in the ground within the environment. Also, the method includes selecting a first patch of the first image that depicts a part of the tree or a second patch of the second image that depicts a part of the environment, and selecting a third patch of the third image that depicts both the part of the tree and the part of the environment. Additionally, the method includes encoding the first patch of the first image to generate first encoded tree data or the second patch of the second image to generate first encoded environment data, and encoding the third patch of the third image to generate third encoded tree data or third encoded environment data. Further, the method includes comparing the first encoded tree data with the third encoded tree data or the first encoded environment data with the third encoded environment data to generate one or more comparison data. Moreover, the method includes determining whether the tree has been planted in the ground based at least in part upon the one or more comparison data.

According to some embodiments, a computing device for validating planting of trees includes one or more processors and a memory that stores instructions for execution by the one or more processors. The instructions, when executed, cause the one or more processors to receive a first image depicting a tree or a second image depicting an environment with a ground where the tree is to be planted, and receive a third image depicting the tree having been planted in the ground within the environment. Also, the instructions, when executed, cause the one or more processors to select a first patch of the first image that depicts a part of the tree or a second patch of the second image that depicts a part of the environment, and select a third patch of the third image that depicts both the part of the tree and the part of the environment. Additionally, the instructions, when executed, cause the one or more processors to encode the first patch of the first image to generate first encoded tree data or the second patch of the second image to generate first encoded environment data, and encode the third patch of the third image to generate third encoded tree data or third encoded environment data. Further, the instructions, when executed, cause the one or more processors to compare the first encoded tree data with the third encoded tree data or the first encoded environment data with the third encoded environment data to generate one or more comparison data. Moreover, the instructions, when executed, cause the one or more processors to determine whether the tree has been planted in the ground based at least in part upon the one or more comparison data.

According to certain embodiments, a non-transitory computer-readable medium stores instructions for validating planting of trees. The instructions are executed by one or more processors of a computing device. The non-transitory computer-readable medium includes instructions to receive a first image depicting a tree or a second image depicting an environment with a ground where the tree is to be planted, and receive a third image depicting the tree having been planted in the ground within the environment. Also, the non-transitory computer-readable medium includes instructions to select a first patch of the first image that depicts a part of the tree or a second patch of the second image that depicts a part of the environment, and select a third patch of the third image that depicts both the part of the tree and the part of the environment. Additionally, the non-transitory computer-readable medium includes instructions to encode the first patch of the first image to generate first encoded tree data or the second patch of the second image to generate first encoded environment data, and encode the third patch of the third image to generate third encoded tree data or third encoded environment data. Further, the non-transitory computer-readable medium includes instructions to compare the first encoded tree data with the third encoded tree data or the first encoded environment data with the third encoded environment data to generate one or more comparison data. Moreover, the non-transitory computer-readable medium includes instructions to determine whether the tree has been planted in the ground based at least in part upon the one or more comparison data.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to validating the planting of trees. More particularly, certain embodiments of the present disclosure provide methods and systems for validating that a tree has been planted based upon images associated with the tree. Merely by way of example, the present disclosure has been applied to comparing different encoded patches of the images associated with the tree to verify that the tree has been planted. But it would be recognized that the present disclosure has much broader range of applicability.

Figure 1:
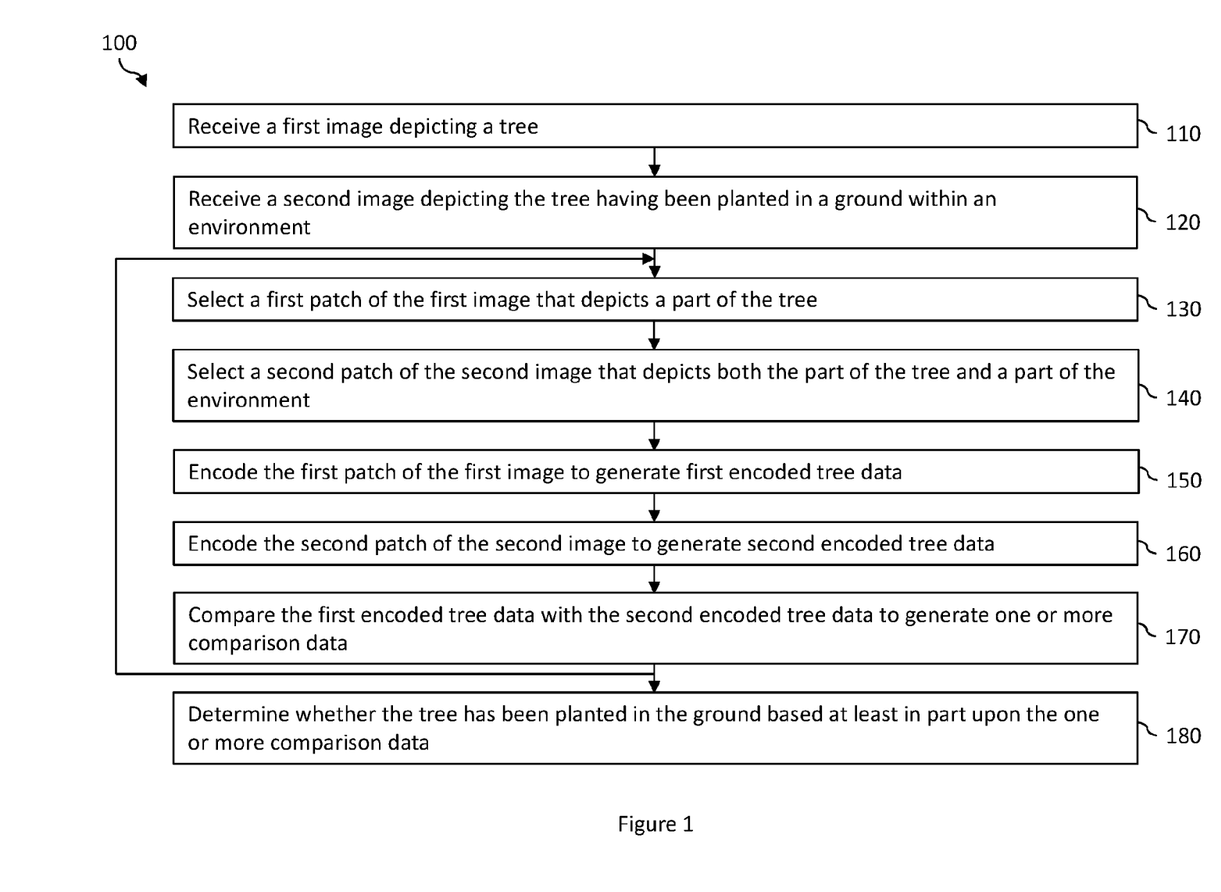
FIG. 1 is a simplified method for validating planting of trees according to certain embodiments of the present disclosure.

I. One or More Methods for Validating Planting of Trees According to Certain Embodiments FIG. 1 is a simplified method for validating planting of trees according to certain embodiments of the present disclosure. The diagrams are merely examples, which should not unduly limit the scope of the claims. One of ordinary skill in the art would recognize many variations, alternatives, and modifications. The method 100 includes process 110 for receiving a first image associated with a tree, process 120 for receiving a second image associated with the tree, process 130 for selecting a first patch of the first image, process 140 for selecting a second patch of the second image, process 150 for encoding the first patch, process 160 for encoding the second patch, process 170 for comparing the encoded patches, and process 180 for determining whether the tree has been planted. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

Figure 4:
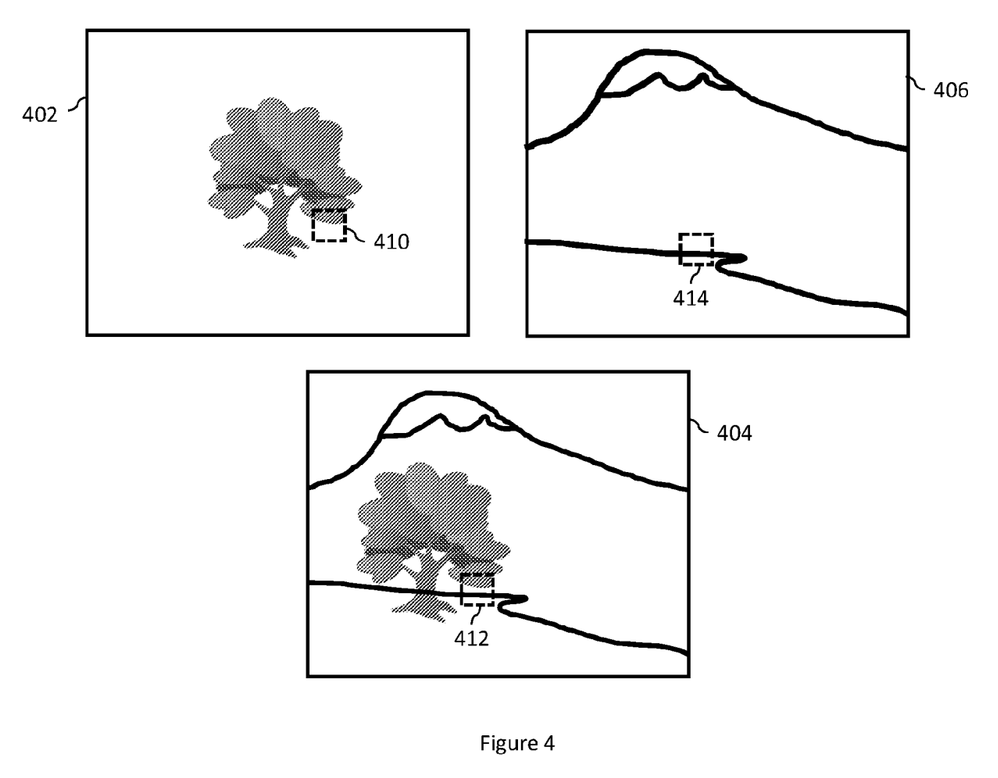
FIG. 4 is a simplified diagram showing planting of trees according to some embodiments of the present disclosure.

At the process 110, the first image depicting the tree is received according to certain embodiments. For example, the first image may depict any type of tree (e.g., oak, maple, birch, spruce, pine, etc.). In various embodiments, the first image depicts the tree itself. FIG. 4 is a simplified diagram showing the planting of trees according to some embodiments of the present disclosure. This diagram is merely an example, which should not unduly limit the scope of the claims. One of ordinary skill in the art would recognize many variations, alternatives, and modifications. In certain embodiments, the first image is illustrated by an image 402 of FIG. 4.

At the process 120, the second image depicting the tree having been planted in a ground within an environment is received according to some embodiments. For example, the second image may depict the tree being planted in any natural or human made environment (e.g., a forest, a park, a garden, etc.). As an example, the environment includes a geographical location of where the tree is being planted. In certain embodiments, the second image is illustrated by an image 404 of FIG. 4. In various embodiments, one or more images associated with the planting of the tree in the ground within the environment are captured and become the first and second images.

At the process 130, the first patch of the first image that depicts a part of the tree is selected according to some embodiments. In various embodiments, the first patch represents a piece (e.g., a group of pixels) of the first image. For example, the first patch shows any part of the tree. In some embodiments, the first patch of the first image is illustrated by a patch 410 in the image 402 of FIG. 4.

At the process 140, the second patch of the second image that depicts both the part of the tree and a part of the environment is selected according to certain embodiments. In various embodiments, the second patch represents a piece (e.g., a group of pixels) of the second image. For example, the second patch shows parts of the tree and the environment. In some embodiments, the second patch of the second image is illustrated by a patch 412 in the image 404 of FIG. 4. In certain embodiments, the second patch is selected to correspond to the first patch. For example, the first patch may show a lower right section of the tree (see patch 410 in FIG. 4) and the second patch may be a corresponding patch that shows the lower right section of the tree and a portion of the environment surrounding the lower right section of the tree (see patch 412 in FIG. 4). In various embodiments, each of the first and second images is divided into a plurality of patches of a particular size (e.g., 100 patches with 100 pixels in each patch), and a suitable image processing algorithm is used to select the first and second patches from the respective plurality of patches.

At the process 150, the first patch of the first image is encoded to generate first encoded tree data according to some embodiments. At the process 160, the second patch of the second image is encoded to generate second encoded tree data according to certain embodiments. In various embodiments, encoding the first and second patches involves learning features in the patches that are important to generate the first and second encoded tree data. In some embodiments, the first and second encoded tree data are determined based upon a model (e.g., a machine learning model, a statistical model, etc.). For example, the first and second patches are provided to the model to determine the first and second encoded tree data. In certain embodiments, the model is an artificial neural network. In some embodiments, the model has been trained, and the trained model possesses existing knowledge of which features in the first and second patches are desirable or useful in determining the first and second encoded tree data. For example, determining the first and second encoded tree data involves that the trained model analyzes the first and second patches based upon the existing knowledge. As an example, analyzing the first and second patches includes various tasks such as performing feature extractions, applying pattern recognition, and/or other suitable tasks.

In certain embodiments, an autoencoder is used to generate the first and second encoded tree data. For example, the autoencoder is a type of artificial neural network that performs feature extraction in an unsupervised manner. As an example, the autoencoder includes a reduction layer for inputs, one or more intermediate layers, and a reconstruction layer for outputs. For example, the reduction layer performs encoding (e.g., dimensional reduction, compression, etc.) on the inputs (e.g., first and second patches), the one or more intermediate layers process the encoded information, and the reconstruction layer generates as outputs data representations (e.g., first and second encoded tree data) that are as close as possible to the inputs.

At the process 170, the first encoded tree data and the second encoded tree data are compared to generate one or more comparison data according to some embodiments. For example, the one or more comparison data indicate a similarity or dissimilarity between the first encoded tree data and the second encoded tree data.

In various embodiments, the one or more comparison data are generated using other suitable techniques to process the first and second patches. In some embodiments, a keypoint detection method can be used to generate the one or more comparison data by comparing the first and second patches directly. For example, if comparison of the first and second patches exceeds a predetermined "match" threshold, then the first and second patches are deemed to be similar enough. In certain embodiments, an object detection method can be used to generate the one or more comparison data by identifying similar objects in the first and second patches. For example, pixels that correspond to the tree or parts of the tree can be identified in the first and second patches by masking all other pixels that do not correspond to the tree or parts of the tree.

At the process 180, a determination is made on whether the tree has been planted in the ground based at least in part upon the one or more comparison data according to certain embodiments. In some embodiments, the determination of whether the tree has been planted in the ground includes validating that the tree has been planted in response to the one or more comparison data satisfying one or more predetermined conditions. For example, the one or more predetermined conditions include a true or false condition. As an example, the tree will be validated to be planted in the ground if the one or more comparison data indicate enough of a similarity between the first encoded tree data and the second encoded tree data to satisfy the true condition.

In certain embodiments, the determination of whether the tree has been planted is based at least in part upon comparing multiple or all patches in the first and second images. For example, the method 100 repeats the processes 130-170 in an iterative manner until all selected patches are processed. As an example, at the process 130, multiple patches of the first image are selected that depict different parts of the tree. For example, at the process 140, multiple patches of the second image are selected that depict both the different parts of the tree and different parts of the environment associated with the different parts of the tree. As an example, at the processes 150 and 160, the multiple patches from the first and second images are encoded to generate multiple encoded tree data. For example, at the process 170, the multiple encoded tree data are compared with one another to generate the one or more comparison data.

In some embodiments, the tree will be deemed to have been planted in the ground if the one or more comparison data indicate comparison similarities among the multiple encoded tree data. For example, the one or more predetermined conditions include a threshold condition. As an example, the tree will be validated to be planted in the ground if results from the comparisons of the multiple encoded tree data are within the threshold condition.

Figure 2:
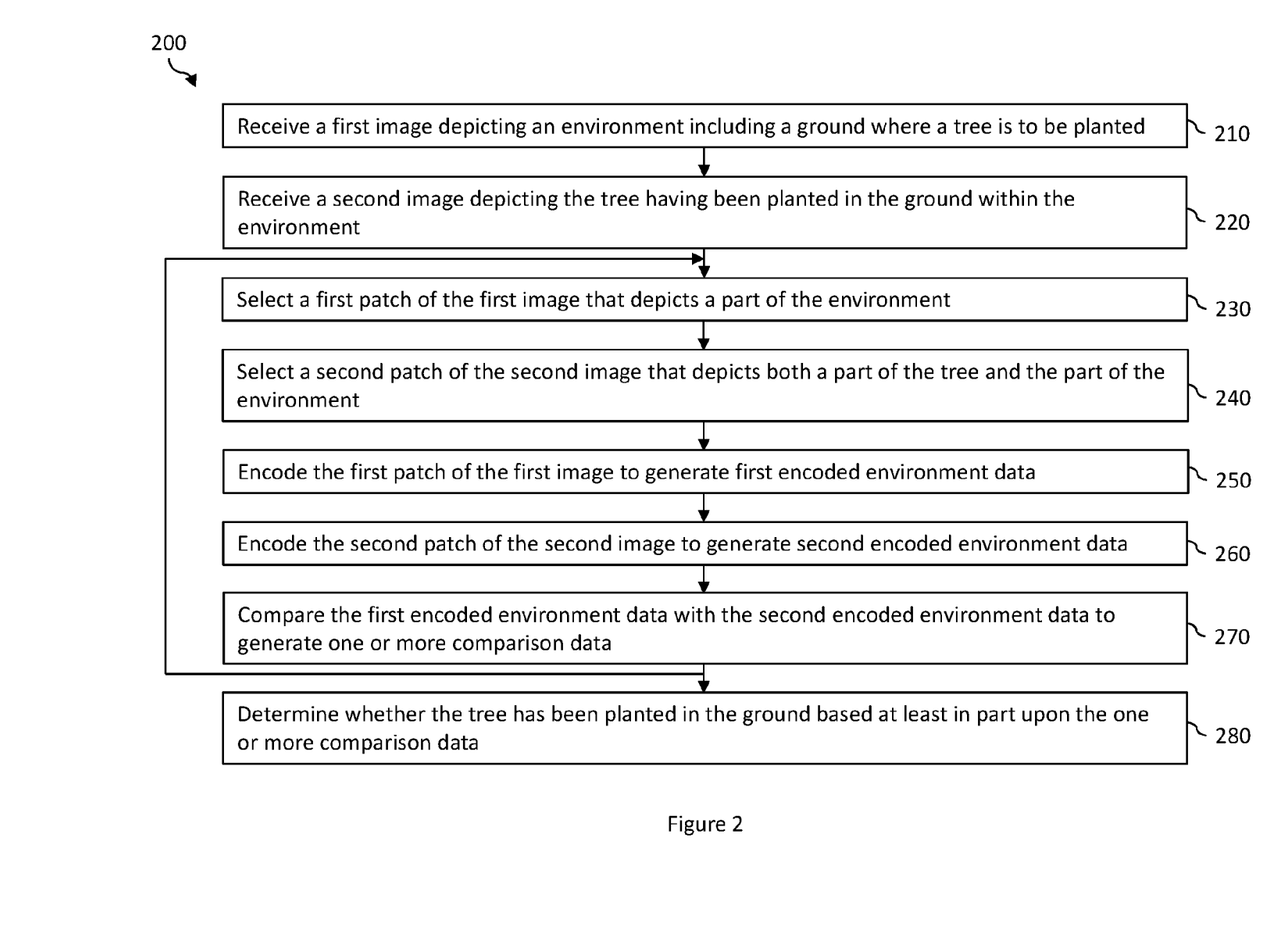
FIG. 2 is a simplified method for validating planting of trees according to some embodiments of the present disclosure.

FIG. 2 is a simplified method for validating planting of trees according to some embodiments of the present disclosure. The diagrams are merely examples, which should not unduly limit the scope of the claims. One of ordinary skill in the art would recognize many variations, alternatives, and modifications. The method 200 includes process 210 for receiving a first image associated with a tree, process 220 for receiving a second image associated with the tree, process 230 for selecting a first patch of the first image, process 240 for selecting a second patch of the second image, process 250 for encoding the first patch, process 260 for encoding the second patch, process 270 for comparing the encoded patches, and process 280 for determining whether the tree has been planted. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 210, the first image depicting an environment including a ground where the tree is to be planted is received according to certain embodiments. For example, the first image may depict any natural or human made environment. As an example, the environment includes a geographical location of where the tree is being planted. In some embodiments, the first image is illustrated by an image 406 of FIG. 4.

At the process 220, the second image depicting the tree having been planted in the ground within the environment is received according to some embodiments. In certain embodiments, the second image is illustrated by the image 404 of FIG. 4. In various embodiments, one or more images associated with the planting of the tree in the ground within the environment are captured and become the first and second images.

At the process 230, the first patch of the first image that depicts a part of the environment is selected according to some embodiments. In various embodiments, the first patch represents a piece of the first image. For example, the first patch shows any part of the environment. In some embodiments, the first patch of the first image is illustrated by a patch 414 in the image 406 of FIG. 4.

At the process 240, the second patch of the second image that depicts both the part of the environment and a part of the tree is selected according to certain embodiments. In various embodiments, the second patch represents a piece of the second image. For example, the second patch shows parts of the tree and the environment. In some embodiments, the second patch of the second image is illustrated by the patch 412 in the image 404 of FIG. 4. In certain embodiments, the second patch is selected to correspond to the first patch. For example, the first patch may show a lower section of the environment (see patch 414 in FIG. 4) and the second patch may be a corresponding patch that shows the lower section of the environment along with a portion of the tree within the lower section of the environment (see patch 412 in FIG. 4). In various embodiments, each of the first and second images is divided into a plurality of patches of a particular size, and a suitable image processing algorithm is used to select the first and second patches from the respective plurality of patches.

At the process 250, the first patch of the first image is encoded to generate first encoded environment data according to some embodiments. At the process 260, the second patch of the second image is encoded to generate second encoded environment data according to certain embodiments. In various embodiments, encoding the first and second patches involves learning features in the patches that are important to generate the first and second encoded environment data. In some embodiments, the first and second encoded environment data are determined based upon a model (e.g., a machine learning model, a statistical model, etc.). For example, the first and second patches are provided to the model to determine the first and second encoded environment data. In certain embodiments, the model is an artificial neural network. In some embodiments, the model has been trained, and the trained model possesses existing knowledge of which features in the first and second patches are desirable or useful in determining the first and second encoded environment data. For example, determining the first and second encoded environment data involves that the trained model analyzes the first and second patches based upon the existing knowledge. As an example, analyzing the first and second patches includes various tasks such as performing feature extractions, applying pattern recognition, and/or other suitable tasks.

In certain embodiments, an autoencoder is used to generate the first and second encoded environment data. For example, the autoencoder is a type of artificial neural network that performs feature extraction in an unsupervised manner. As an example, the autoencoder includes a reduction layer for inputs, one or more intermediate layers, and a reconstruction layer for outputs. For example, the reduction layer performs encoding on the inputs (e.g., first and second patches), the one or more intermediate layers process the encoded information, and the reconstruction layer generates as outputs data representations (e.g., first and second encoded environment data) that are as close as possible to the inputs.

At the process 270, the first encoded environment data and the second encoded environment data are compared to generate one or more comparison data according to some embodiments. For example, the one or more comparison data indicate a similarity or dissimilarity between the first encoded environment data and the second encoded environment data.

At the process 280, a determination is made on whether the tree has been planted in the ground based at least in part upon the one or more comparison data according to certain embodiments. In some embodiments, the determination of whether the tree has been planted in the ground includes validating that the tree has been planted in response to the one or more comparison data satisfying one or more predetermined conditions. For example, the one or more predetermined conditions include a true or false condition. As an example, the tree will be validated to be planted in the ground if the one or more comparison data indicate enough of a similarity between the first encoded environment data and the second encoded environment data to satisfy the true condition.

In certain embodiments, the determination of whether the tree has been planted is based at least in part upon comparing multiple or all patches in the first and second images. For example, the method 200 repeats the processes 230-270 in an iterative manner until all selected patches are processed. As an example, at the process 230, multiple patches of the first image are selected that depict different parts of the environment. For example, at the process 240, multiple patches of the second image are selected that depict both the different parts of the environment and different parts of the tree within the different parts of the environment. As an example, at the processes 250 and 260, the multiple patches from the first and second images are encoded to generate multiple encoded environment data. For example, at the process 270, the multiple encoded environment data are compared with one another to generate the one or more comparison data.

In some embodiments, the tree will be deemed to have been planted in the ground if the one or more comparison data indicate comparison similarities among the multiple encoded environment data. For example, the one or more predetermined conditions include a threshold condition. As an example, the tree will be validated to be planted in the ground if results from the comparisons of the multiple encoded environment data are within the threshold condition.

Figure 3:
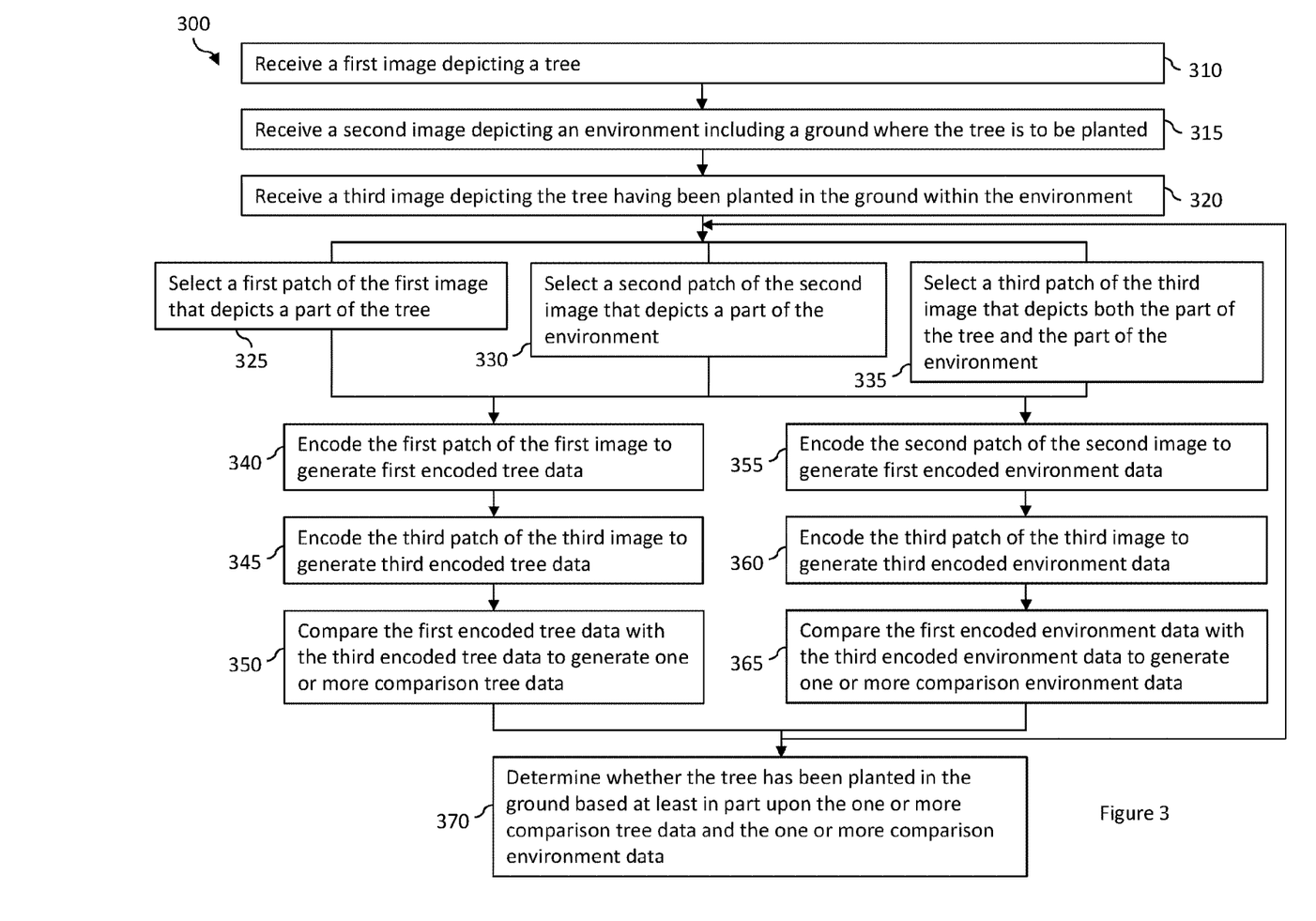
FIG. 3 is a simplified method for validating planting of trees according to certain embodiments of the present disclosure.

FIG. 3 is a simplified method for validating planting of trees according to certain embodiments of the present disclosure. The diagrams are merely examples, which should not unduly limit the scope of the claims. One of ordinary skill in the art would recognize many variations, alternatives, and modifications. The method 300 includes process 310 for receiving a first image associated with a tree, process 315 for receiving a second image associated with the tree, process 320 for receiving a third image associated with the tree, process 325 for selecting a first patch of the first image, process 330 for selecting a second patch of the second image, process 335 for selecting a third patch of the third image, process 340 for encoding the first patch, process 345 for encoding the third patch, process 350 for comparing the encoded first and third patches, process 355 for encoding the second patch, process 360 for encoding the third patch, process 365 for comparing the encoded second and third patches, and process 370 for determining whether the tree has been planted. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 310, the first image depicting the tree is received according to certain embodiments. For example, the first image is illustrated by the image 402 of FIG. 4. At the process 315, the second image depicting an environment including a ground where the tree is to be planted is received according to some embodiments. For example, the second image is illustrated by the image 406 of FIG. 4. At the process 320, the third image depicting the tree having been planted in the ground within the environment is received according to certain embodiments. For example, the third image is illustrated by the image 404 of FIG. 4. In various embodiments, one or more images associated with the planting of the tree in the ground within the environment are captured and become the first, second and third images.

At the process 325, the first patch of the first image that depicts a part of the tree is selected according to some embodiments. For example, the first patch of the first image is illustrated by the patch 410 in the image 402 of FIG. 4. At the process 330, the second patch of the second image that depicts a part of the environment is selected according to certain embodiments. For example, the second patch of the second image is illustrated by the patch 414 in the image 406 of FIG. 4. At the process 335, the third patch of the third image that depicts both the part of the tree and the part of the environment is selected according to some embodiments. For example, the third patch of the third image is illustrated by the patch 412 in the image 404 of FIG. 4.

In various embodiments, the third patch is selected to correspond to the first and second patches. In some embodiments, each of the first, second, and third images is divided into a plurality of patches of a particular size. In certain embodiments, a suitable image processing algorithm is used to select the first, second, and third patches from the respective plurality of patches. According to various embodiments, the processes 325-335 may be performed in parallel (shown in FIG. 3) or in series as desired.

At the process 340, the first patch of the first image is encoded to generate first encoded tree data according to some embodiments. At the process 345, the third patch of the third image is encoded to generate third encoded tree data according to certain embodiments. At the process 350, the first encoded tree data and the third encoded tree data are compared to generate one or more comparison tree data according to some embodiments. For example, the one or more comparison tree data indicate a similarity or dissimilarity between the first encoded tree data and the third encoded tree data.

At the process 355, the second patch of the second image is encoded to generate first encoded environment data according to certain embodiments. At the process 360, the third patch of the third image is encoded to generate third encoded environment data according to some embodiments. At the process 365, the first encoded environment data and the third encoded environment data are compared to generate one or more comparison environment data according to certain embodiments. For example, the one or more comparison environment data indicate a similarity or dissimilarity between the first encoded environment data and the third encoded environment data. According to various embodiments, the processes 340-350 and the processes 355-365 may be performed in parallel (shown in FIG. 3) or in series as desired.

In various embodiments, the first and third encoded tree data and/or the first and third encoded environment data are determined based upon a model (e.g., a machine learning model, a statistical model, etc.). For example, the first, second, and third patches are provided to the model to determine the first and third encoded tree data and/or the first and third encoded environment data. In some embodiments, the model has been trained, and the trained model possesses existing knowledge of which features in the first, second, and third patches are desirable or useful in determining the first and third encoded tree data and/or the first and third encoded environment data. For example, determining the first and third encoded tree data and/or the first and third encoded environment data involves that the trained model analyzes the first, second, and third patches based upon the existing knowledge. As an example, analyzing the first, second, and third patches includes various tasks such as performing feature extractions, applying pattern recognition, and/or other suitable tasks.

In certain embodiments, an autoencoder is used to generate the first and third encoded tree data and/or the first and third encoded environment data. For example, the autoencoder includes a reduction layer for inputs, one or more intermediate layers, and a reconstruction layer for outputs. For example, the reduction layer performs encoding on the first, second, and third patches, the one or more intermediate layers process the encoded information, and the reconstruction layer generates the first and third encoded tree data and/or the first and third encoded environment data.

At the process 370, a determination is made on whether the tree has been planted in the ground based at least in part upon the one or more comparison tree data and the one or more comparison environment data according to some embodiments. In some embodiments, the determination of whether the tree has been planted in the ground includes validating that the tree has been planted in response to the one or more comparison tree data satisfying one or more predetermined tree conditions and the one or more comparison environment data satisfying one or more predetermined environment conditions. For example, the one or more predetermined tree conditions include a true or false tree condition. As an example, the tree will be validated to be planted in the ground if the one or more comparison tree data indicate enough of a similarity between the first encoded tree data and the third encoded tree data to satisfy the true tree condition. For example, the one or more predetermined environment conditions include a true or false environment condition. As an example, the tree will be validated to be planted in the ground if the one or more comparison environment data indicate enough of a similarity between the first encoded environment data and the third encoded environment data to satisfy the true environment condition.

In various embodiments, the determination of whether the tree has been planted is based at least in part upon comparing multiple or all patches in the first, second, and third images. For example, the method 300 repeats the processes 325-365 in an iterative manner until all selected patches are processed. In some embodiments, at the process 325, multiple patches of the first image are selected that depict different parts of the tree. In certain embodiments, at the process 330, multiple patches of the second image are selected that depict different parts of the environment. In some embodiments, at the process 335, multiple patches of the third image are selected that depict both the different parts of the tree and the different parts of the environment associated with the different parts of the tree.

In some embodiments, at the processes 340 and 345, the multiple patches from the first and third images are encoded to generate multiple encoded tree data. In certain embodiments, at the processes 355 and 360, the multiple patches from the second and third images are encoded to generate multiple encoded environment data. In some embodiments, at the process 350, the multiple encoded tree data are compared with one another to generate the one or more comparison tree data. In certain embodiments, at the process 365, the multiple encoded environment data are compared with one another to generate the one or more comparison environment data.

In some embodiments, the tree will be deemed to have been planted in the ground if the one or more comparison tree data indicate comparison similarities among the multiple encoded tree data. For example, the one or more predetermined tree conditions include a threshold tree condition. As an example, the tree will be validated to be planted in the ground if results from the comparisons of the multiple encoded tree data are within the threshold tree condition.

In certain embodiments, the tree will be deemed to have been planted in the ground if the one or more comparison environment data indicate comparison similarities among the multiple encoded environment data. For example, the one or more predetermined environment conditions include a threshold environment condition. As an example, the tree will be validated to be planted in the ground if results from the comparisons of the multiple encoded environment data are within the threshold environment condition.

Figure 5:
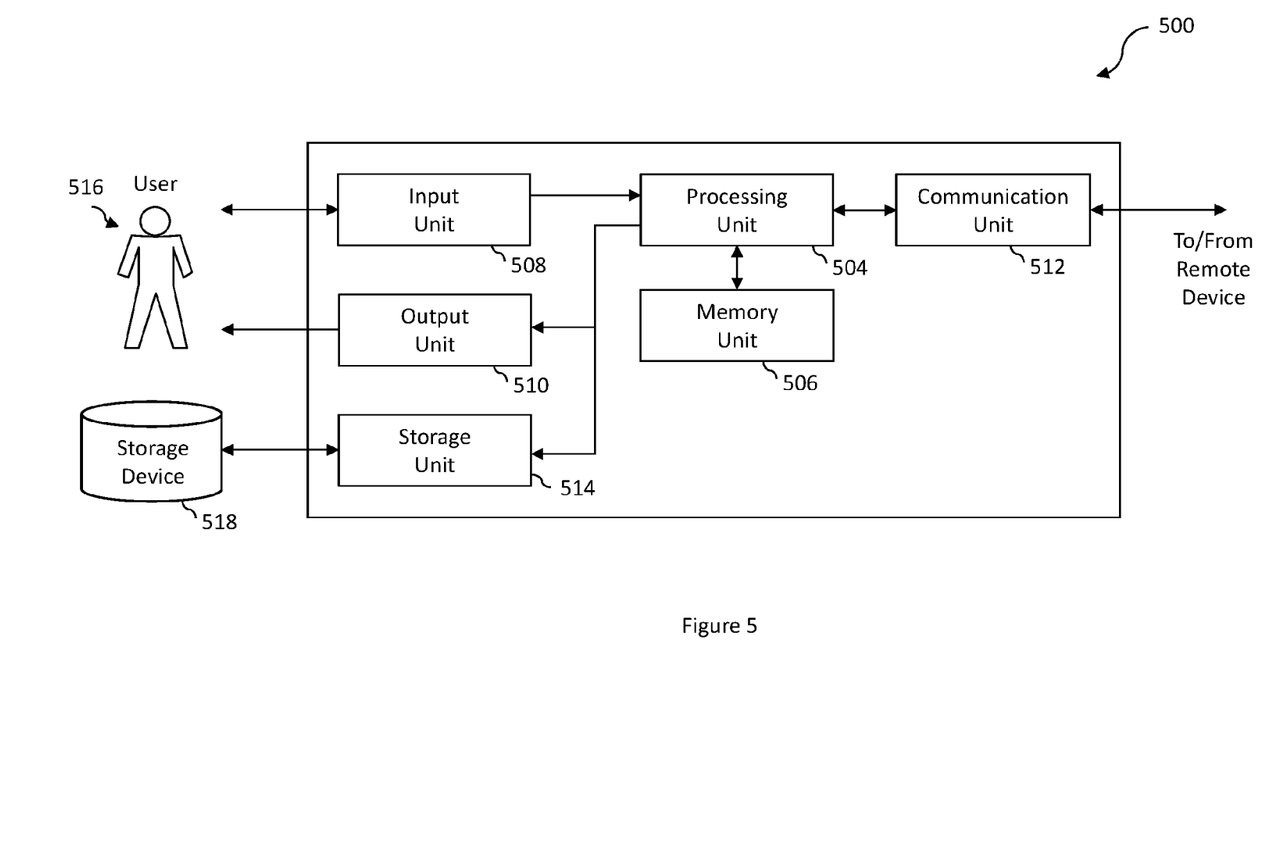
FIG. 5 is a simplified computing device for validating planting of trees according to certain embodiments of the present disclosure.

II. One or More Computing Devices for Validating Planting of Trees According to Certain Embodiments FIG. 5 is a simplified computing device for validating planting of trees according to certain embodiments of the present disclosure. This diagram is merely an example, which should not unduly limit the scope of the claims. One of ordinary skill in the art would recognize many variations, alternatives, and modifications. The computing device 500 includes a processing unit 504, a memory unit 506, an input unit 508, an output unit 510, a communication unit 512, and a storage unit 514. In various embodiments, the computing device 500 is configured to be in communication with a user 516 and/or a storage device 518. In some embodiments, the computing device 500 is configured to implement the method 100 of FIG. 1, the method 200 of FIG. 2, and/or the method 300 of FIG. 3. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the processing unit 504 is configured for executing instructions, such as instructions to implement the method 100 of FIG. 1, the method 200 of FIG. 2, and/or the method 300 of FIG. 3. In some embodiments, the executable instructions are stored in the memory unit 506. In certain embodiments, the processing unit 504 includes one or more processing units (e.g., in a multi-core configuration). In some embodiments, the processing unit 504 includes and/or is communicatively coupled to one or more modules for implementing the methods and systems described in the present disclosure. In certain embodiments, the processing unit 504 is configured to execute instructions within one or more operating systems. In some embodiments, upon initiation of a computer-implemented method, one or more instructions is executed during initialization. In certain embodiments, one or more operations is executed to perform one or more processes described herein. In some embodiments, an operation may be general or specific to a particular programming language (e.g., C, C++, Java, or other suitable programming languages, etc.).

In various embodiments, the memory unit 506 includes a device allowing information, such as executable instructions and/or other data to be stored and retrieved. In some embodiments, the memory unit 506 includes one or more computer readable media. In certain embodiments, the memory unit 506 includes computer readable instructions for providing a user interface, such as to the user 516, via the output unit 510. In some embodiments, a user interface includes a web browser and/or a client application. For example, a web browser enables the user 516 to interact with media and/or other information embedded on a web page and/or a website. In certain embodiments, the memory unit 506 includes computer readable instructions for receiving and processing an input via the input unit 508. In some embodiments, the memory unit 306 includes random access memory (RAM) such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAM).

In various embodiments, the input unit 508 is configured to receive input (e.g., from the user 516). In some embodiments, the input unit 508 includes a keyboard, a pointing device, a mouse, a stylus, a touch sensitive panel (e.g., a touch pad or touch screen), a gyroscope, an accelerometer, a position sensor (e.g., GPS sensor), and/or an audio input device. In certain embodiments, the input unit 508 is configured to function as both an input unit and an output unit.

In various embodiments, the output unit 510 includes a media output unit configured to present information to the user 516. In some embodiments, the output unit 510 includes any component capable of conveying information to the user 516. In certain embodiments, the output unit 510 includes an output adapter such as a video adapter and/or an audio adapter. For example, the output unit 510 is operatively coupled to the processing unit 504 and/or a visual display device to present information to the user 516 (e.g., a liquid crystal display (LCD), a light emitting diode (LED) display, an organic light emitting diode (OLED) display, a cathode ray tube (CRT) display, a projected display, etc.). As an example, the output unit 510 is operatively coupled to the processing unit 504 and/or an audio display device to present information to the user 516 (e.g., a speaker arrangement or headphones).

In various embodiments, the communication unit 512 is configured to be communicatively coupled to a remote device. In some embodiments, the communication unit 512 includes a wired network adapter, a wireless network adapter, a wireless data transceiver for use with a mobile phone network (e.g., 3G, 4G, 5G, Bluetooth, etc.), and/or other mobile data networks. In certain embodiments, other types of short-range or long-range networks may be used. In some embodiments, the communication unit 512 is configured to provide email integration for communicating data between a server and one or more clients.

In various embodiments, the storage unit 514 is configured to enable communication between the computing device 500 and the storage device 518. In some embodiments, the storage unit 514 is a storage interface. For example, the storage interface is any component capable of providing the processing unit 504 with access to the storage device 518. In certain embodiments, the storage unit 514 includes an advanced technology attachment (ATA) adapter, a serial ATA (SATA) adapter, a small computer system interface (SCSI) adapter, a RAID controller, a SAN adapter, a network adapter, and/or any other component capable of providing the processing unit 504 with access to the storage device 518.

In various embodiments, the storage device 518 includes any computer-operated hardware suitable for storing and/or retrieving data. In certain embodiments, the storage device 518 is integrated in the computing device 500. In some embodiments, the storage device 518 includes a database such as a local database or a cloud database. In certain embodiments, the storage device 518 includes one or more hard disk drives. In some embodiments, the storage device 518 is external and is configured to be accessed by a plurality of server systems. In certain embodiments, the storage device 518 includes multiple storage units such as hard disks or solid state disks in a redundant array of inexpensive disks configuration. In some embodiments, the storage device 518 includes a storage area network and/or a network attached storage system.

Figure 6:
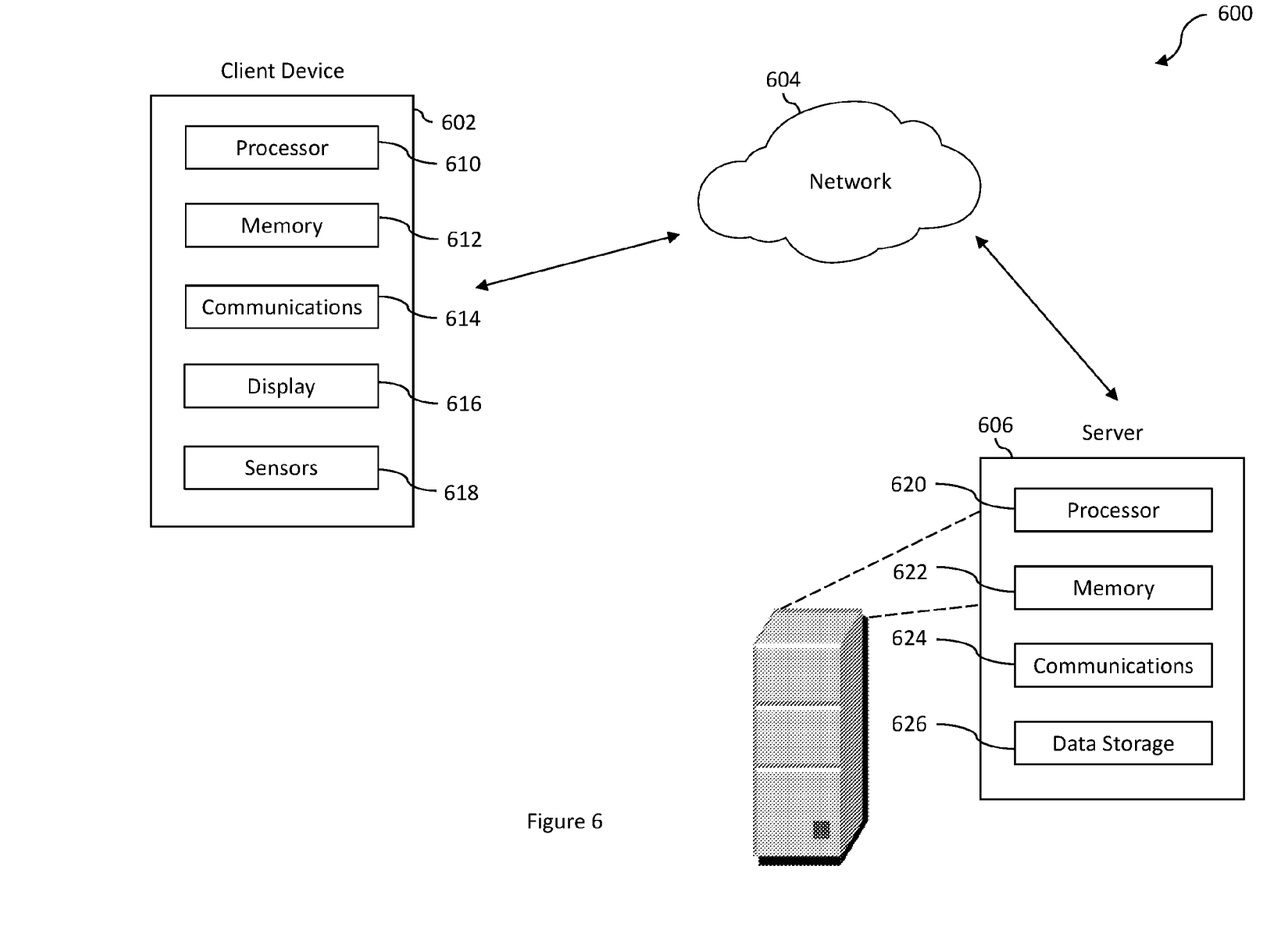
FIG. 6 is a simplified system for validating planting of trees according to some embodiments of the present disclosure.

III. One or More Systems for Validating Planting of Trees According to Certain Embodiments FIG. 6 is a simplified system for validating planting of trees according to certain embodiments of the present disclosure. This diagram is merely an example, which should not unduly limit the scope of the claims. One of ordinary skill in the art would recognize many variations, alternatives, and modifications. The system 600 includes a client device 602, a network 604, and a server 606. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 600 is used to implement the method 100, the method 200, and/or the method 300. According to certain embodiments, the client device 602 includes a processor 610 (e.g., a central processing unit (CPU), a graphics processing unit (GPU)), a memory 612 (e.g., RAM, ROM, flash memory), a communications unit 614 (e.g., a network transceiver), a display unit 616 (e.g., a touchscreen), and one or more sensors 618 (e.g., an accelerometer, a gyroscope, a magnetometer, a barometer, a GPS sensor). As an example, the client device 602 is a mobile device (e.g., a smartphone) associated with a user.

According to some embodiments, the server 606 includes a processor 620 (e.g., a microprocessor, a microcontroller), a memory 622, a communications unit 624 (e.g., a network transceiver), and a data storage 626 (e.g., one or more databases). In some embodiments, the server 606 is a single server, while in certain embodiments, the server 606 includes a plurality of servers with distributed processing. In FIG. 6, the data storage 626 is shown to be part of the server 606. In some embodiments, the data storage 626 is a separate entity coupled to the server 606 via a network such as the network 604.

According to certain embodiments, the server 606 includes various software applications stored in the memory 622 and executable by the processor 620. For example, these software applications include specific programs, routines, or scripts for performing functions associated with the method 100, the method 200, and/or the method 300. As an example, the software applications include general-purpose software applications for data processing, network communication, database management, web server operation, and/or other functions typically performed by a server.

According to some embodiments, data/information determined or generated by the method 100, the method 200, and/or the method 300 on the server 606 (e.g., one or more images associated with the planting of the tree) are transmitted to the client device 602, via the network 604 (e.g., via a local area network (LAN), a wide area network (WAN), the Internet), to be displayed to the user via the display unit 616. In some embodiments, one or more processes of the method 100, one or more processes of the method 200, and/or one or more processes of the method 300 are performed by the client device 602.

IV. Examples of Certain Embodiments of the Present Disclosure

According to certain embodiments, a method for validating planting of trees includes receiving a first image depicting a tree or a second image depicting an environment with a ground where the tree is to be planted, and receiving a third image depicting the tree having been planted in the ground within the environment. Also, the method includes selecting a first patch of the first image that depicts a part of the tree or a second patch of the second image that depicts a part of the environment, and selecting a third patch of the third image that depicts both the part of the tree and the part of the environment. Additionally, the method includes encoding the first patch of the first image to generate first encoded tree data or the second patch of the second image to generate first encoded environment data, and encoding the third patch of the third image to generate third encoded tree data or third encoded environment data. Further, the method includes comparing the first encoded tree data with the third encoded tree data or the first encoded environment data with the third encoded environment data to generate one or more comparison data. Moreover, the method includes determining whether the tree has been planted in the ground based at least in part upon the one or more comparison data. For example, the method is implemented according to at least FIG. 1, FIG. 2, and/or FIG. 3.

According to some embodiments, a computing device for validating planting of trees includes one or more processors and a memory that stores instructions for execution by the one or more processors. The instructions, when executed, cause the one or more processors to receive a first image depicting a tree or a second image depicting an environment with a ground where the tree is to be planted, and receive a third image depicting the tree having been planted in the ground within the environment. Also, the instructions, when executed, cause the one or more processors to select a first patch of the first image that depicts a part of the tree or a second patch of the second image that depicts a part of the environment, and select a third patch of the third image that depicts both the part of the tree and the part of the environment. Additionally, the instructions, when executed, cause the one or more processors to encode the first patch of the first image to generate first encoded tree data or the second patch of the second image to generate first encoded environment data, and encode the third patch of the third image to generate third encoded tree data or third encoded environment data. Further, the instructions, when executed, cause the one or more processors to compare the first encoded tree data with the third encoded tree data or the first encoded environment data with the third encoded environment data to generate one or more comparison data. Moreover, the instructions, when executed, cause the one or more processors to determine whether the tree has been planted in the ground based at least in part upon the one or more comparison data. For example, the computing device is implemented according to at least FIG. 5 and/or FIG. 6.

According to certain embodiments, a non-transitory computer-readable medium stores instructions for validating planting of trees. The instructions are executed by one or more processors of a computing device. The non-transitory computer-readable medium includes instructions to receive a first image depicting a tree or a second image depicting an environment with a ground where the tree is to be planted, and receive a third image depicting the tree having been planted in the ground within the environment. Also, the non-transitory computer-readable medium includes instructions to select a first patch of the first image that depicts a part of the tree or a second patch of the second image that depicts a part of the environment, and select a third patch of the third image that depicts both the part of the tree and the part of the environment. Additionally, the non-transitory computer-readable medium includes instructions to encode the first patch of the first image to generate first encoded tree data or the second patch of the second image to generate first encoded environment data, and encode the third patch of the third image to generate third encoded tree data or third encoded environment data. Further, the non-transitory computer-readable medium includes instructions to compare the first encoded tree data with the third encoded tree data or the first encoded environment data with the third encoded environment data to generate one or more comparison data. Moreover, the non-transitory computer-readable medium includes instructions to determine whether the tree has been planted in the ground based at least in part upon the one or more comparison data. For example, the non-transitory computer-readable medium is implemented according to at least FIG. 1, FIG. 2, FIG. 3, FIG. 5, and/or FIG. 6.

V. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VI. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method comprising:
    selecting, by a computing device, a first patch of a first image that depicts a part of a tree or a second patch of a second image that depicts a part of an environment, and a third patch of a third image that depicts the part of the tree and the part of the environment;
    encoding, by the computing device, the first patch of the first image to generate first encoded tree data or the second patch of the second image to generate first encoded environment data, and the third patch of the third image to generate third encoded tree data or third encoded environment data, wherein the encoding the first patch or the second patch involves learning to generate the first encoded tree data or the first encoded environment data, respectively, based upon a model, wherein the model is an artificial neural network;
    analyzing, by the computing device, the first patch or the second patch, wherein the analyzing the first patch or the second patch includes performing one or more of feature extraction or applying pattern recognition;
    using, by the computing device, an autoencoder to generate the first encoded tree data or the first encoded environment data, wherein the autoencoder includes a reduction layer for inputs, one or more intermediate layers, and a reconstruction layer for outputs;
    comparing, by the computing device, the first encoded tree data with the third encoded tree data or the first encoded environment data with the third encoded environment data to generate one or more comparison data; and
    determining, by the computing device, whether the tree is in the environment based at least in part upon the one or more comparison data.

2. The computer-implemented method of claim 1, wherein the determining, by the computing device, whether the tree is in the environment based at least in part upon the one or more comparison data includes:
    validating, by the computing device, that the tree is in the environment in response to the one or more comparison data satisfying one or more predetermined conditions.

3. The computer-implemented method of claim 1, further comprising:
    receiving, by the computing device, the first image depicting the tree;
    selecting, by the computing device, the first patch of the first image that depicts the part of the tree;
    encoding, by the computing device, the first patch of the first image to generate the first encoded tree data;
    encoding, by the computing device, the third patch of the third image to generate the third encoded tree data; and
    comparing, by the computing device, the first encoded tree data with the third encoded tree data to generate the one or more comparison data.

4. The computer-implemented method of claim 1, further comprising:
    receiving, by the computing device, the second image depicting the environment;
    selecting, by the computing device, the second patch of the second image that depicts the part of the environment;
    encoding, by the computing device, the second patch of the second image to generate the first encoded environment data;
    encoding, by the computing device, the third patch of the third image to generate the third encoded environment data; and
    comparing, by the computing device, the first encoded environment data with the third encoded environment data to generate the one or more comparison data.

5. The computer-implemented method of claim 1, further comprising:
    receiving, by the computing device, the first image depicting the tree;
    receiving, by the computing device, the second image depicting the environment;
    selecting, by the computing device, the first patch of the first image that depicts the part of the tree;
    selecting, by the computing device, the second patch of the second image that depicts the part of the environment;

encoding, by the computing device, the first patch of the first image to generate the first encoded tree data;

encoding, by the computing device, the third patch of the third image to generate the third encoded tree data;

comparing, by the computing device, the first encoded tree data with the third encoded tree data to generate one or more comparison tree data;

encoding, by the computing device, the second patch of the second image to generate the first encoded environment data;

encoding, by the computing device, the third patch of the third image to generate the third encoded environment data;

comparing, by the computing device, the first encoded environment data with the third encoded environment data to generate one or more comparison environment data; and determining, by the computing device, whether the tree is in the environment based at least in part upon the one or more comparison tree data and the one or more comparison environment data.

6. The computer-implemented method of claim 5, wherein the determining, by the computing device, whether the tree is in the environment based at least in part upon the one or more comparison tree data and the one or more comparison environment data includes:

validating, by the computing device, that the tree is in the environment in response to the one or more comparison tree data satisfying one or more predetermined tree conditions and the one or more comparison environment data satisfying one or more predetermined environment conditions.

7. The computer-implemented method of claim 1, further comprising:

capturing, by the computing device, one or more images associated with whether the tree is in the environment.

8. A computing device comprising:

one or more processors; and a memory storing instructions that, when executed by the one or more processors, cause the one or more processors to:

select a first patch of a first image that depicts a part of a tree or a second patch of a second image that depicts a part of an environment, and a third patch of a third image that depicts the part of the tree and the part of the environment;

encode the first patch of the first image to generate first encoded tree data or the second patch of the second image to generate first encoded environment data, and the third patch of the third image to generate third encoded tree data or third encoded environment data, wherein encoding the first patch or the second patch involves learning to generate the first encoded tree data or the first encoded environment data, respectively, based upon a model, wherein the model is an artificial neural network;

analyze the first patch or the second patch, wherein analyzing the first patch or the second patch includes performing one or more of feature extraction or applying pattern recognition;

use an autoencoder to generate the first encoded tree data or the first encoded environment data, wherein the autoencoder includes a reduction layer for inputs, one or more intermediate layers, and a reconstruction layer for outputs;

compare the first encoded tree data with the third encoded tree data or the first encoded environment data with the third encoded environment data to generate one or more comparison data; and determine whether the tree is in the environment based at least in part upon the one or more comparison data.

9. The computing device of claim 8, wherein the instructions that cause the one or more processors to determine whether the tree is in the environment based at least in part upon the one or more comparison data further cause the one or more processors to:

validate that the tree is in the environment in response to the one or more comparison data satisfying one or more predetermined conditions.

10. The computing device of claim 8, wherein the instructions, when executed by the one or more processors, further cause the one or more processors to:

receive the first image depicting the tree;

select the first patch of the first image that depicts the part of the tree;

encode the first patch of the first image to generate the first encoded tree data;

encode the third patch of the third image to generate the third encoded tree data; and compare the first encoded tree data with the third encoded tree data to generate the one or more comparison data.

11. The computing device of claim 8, wherein the instructions, when executed by the one or more processors, further cause the one or more processors to:

receive, the second image depicting the environment;

select the second patch of the second image that depicts the part of the environment;

encode the second patch of the second image to generate the first encoded environment data;

encode the third patch of the third image to generate the third encoded environment data; and compare the first encoded environment data with the third encoded environment data to generate the one or more comparison data.

12. The computing device of claim 8, wherein the instructions, when executed by the one or more processors, further cause the one or more processors to:

receive the first image depicting the tree;

receive the second image depicting the environment;

select the first patch of the first image that depicts the part of the tree;

select the second patch of the second image that depicts the part of the environment;

encode the first patch of the first image to generate the first encoded tree data;

encode the third patch of the third image to generate the third encoded tree data;

compare the first encoded tree data with the third encoded tree data to generate one or more comparison tree data;

encode the second patch of the second image to generate the first encoded environment data;

encode the third patch of the third image to generate the third encoded environment data;

compare the first encoded environment data with the third encoded environment data to generate one or more comparison environment data; and determine whether the tree is in the environment based at least in part upon the one or more comparison tree data and the one or more comparison environment data.

13. The computing device of claim 12, wherein the instructions that cause the one or more processors to determine whether the tree is in the environment based at least in part upon the one or more comparison tree data and the one or more comparison environment data further cause the one or more processors to:

validate that the tree is in the environment in response to the one or more comparison tree data satisfying one or more predetermined tree conditions and the one or more comparison environment data satisfying one or more predetermined environment conditions.

14. The computing device of claim 8, wherein the instructions, when executed by the one or more processors, further cause the one or more processors to:

capture one or more images associated with whether the tree is in the environment.

15. A non-transitory computer-readable medium storing instructions, the instructions when executed by one or more processors of a computing device, cause the computing device to:

select a first patch of a first image that depicts a part of a tree or a second patch of a second image that depicts a part of an environment, and a third patch of a third image that depicts the part of the tree and the part of the environment;

encode the first patch of the first image to generate first encoded tree data or the second patch of the second image to generate first encoded environment data, and the third patch of the third image to generate third encoded tree data or third encoded environment data, wherein encoding the first patch or the second patch involves learning to generate the first encoded tree data or the first encoded environment data, respectively, based upon a model, wherein the model is an artificial neural network;

analyze the first patch or the second patch, wherein analyzing the first patch or the second patch includes performing one or more of feature extraction or applying pattern recognition;

use an autoencoder to generate the first encoded tree data or the first encoded environment data, wherein the autoencoder includes a reduction layer for inputs, one or more intermediate layers, and a reconstruction layer for outputs;

compare the first encoded tree data with the third encoded tree data or the first encoded environment data with the third encoded environment data to generate one or more comparison data; and     determine whether the tree is in the environment based at least in part upon the one or more comparison data.

16. The non-transitory computer-readable medium of claim 15, wherein the instructions that when executed by the one or more processors cause the computing device to determine whether the tree is in the environment based at least in part upon the one or more comparison data further cause the computing device to:

validate that the tree is in the environment in response to the one or more comparison data satisfying one or more predetermined conditions.

17. The non-transitory computer-readable medium of claim 15, wherein the instructions, when executed by the one or more processors, further cause the computing device to:

receive the first image depicting the tree;

select the first patch of the first image that depicts the part of the tree;

encode the first patch of the first image to generate the first encoded tree data;

encode the third patch of the third image to generate the third encoded tree data; and     compare the first encoded tree data with the third encoded tree data to generate the one or more comparison data.

18. The non-transitory computer-readable medium of claim 15, wherein the instructions, when executed by the one or more processors, further cause the computing device to:

receive, the second image depicting the environment;

select the second patch of the second image that depicts the part of the environment;

encode the second patch of the second image to generate the first encoded environment data;

encode the third patch of the third image to generate the third encoded environment data; and     compare the first encoded environment data with the third encoded environment data to generate the one or more comparison data.

19. The non-transitory computer-readable medium of claim 15, wherein the instructions, when executed by the one or more processors, further cause the computing device to:

receive the first image depicting the tree;

receive the second image depicting the environment;

select the first patch of the first image that depicts the part of the tree;

select the second patch of the second image that depicts the part of the environment;

encode the first patch of the first image to generate the first encoded tree data;

encode the third patch of the third image to generate the third encoded tree data;

compare the first encoded tree data with the third encoded tree data to generate one or more comparison tree data;

encode the second patch of the second image to generate the first encoded environment data;

encode the third patch of the third image to generate the third encoded environment data;

compare the first encoded environment data with the third encoded environment data to generate one or more comparison environment data; and     determine whether the tree is in the environment based at least in part upon the one or more comparison tree data and the one or more comparison environment data.

20. The non-transitory computer-readable medium of claim 19, wherein the instructions that when executed by the one or more processors cause the computing device to determine whether the tree is in the environment based at least in part upon the one or more comparison tree data and the one or more comparison environment data further cause the computing device to:

validate that the tree is in the environment in response to the one or more comparison tree data satisfying one or more predetermined tree conditions and the one or more comparison environment data satisfying one or more predetermined environment conditions.

* * * * *